April 7, 1959 W. T. HAKE 2,880,630
POWER SWIVELING HEAD
Filed Jan. 28, 1958 3 Sheets-Sheet 1

INVENTOR.
Walter T. Hake
BY
Walter L. Schlegel, Jr.
Atty.

Witness:
Neil J. Driscoll

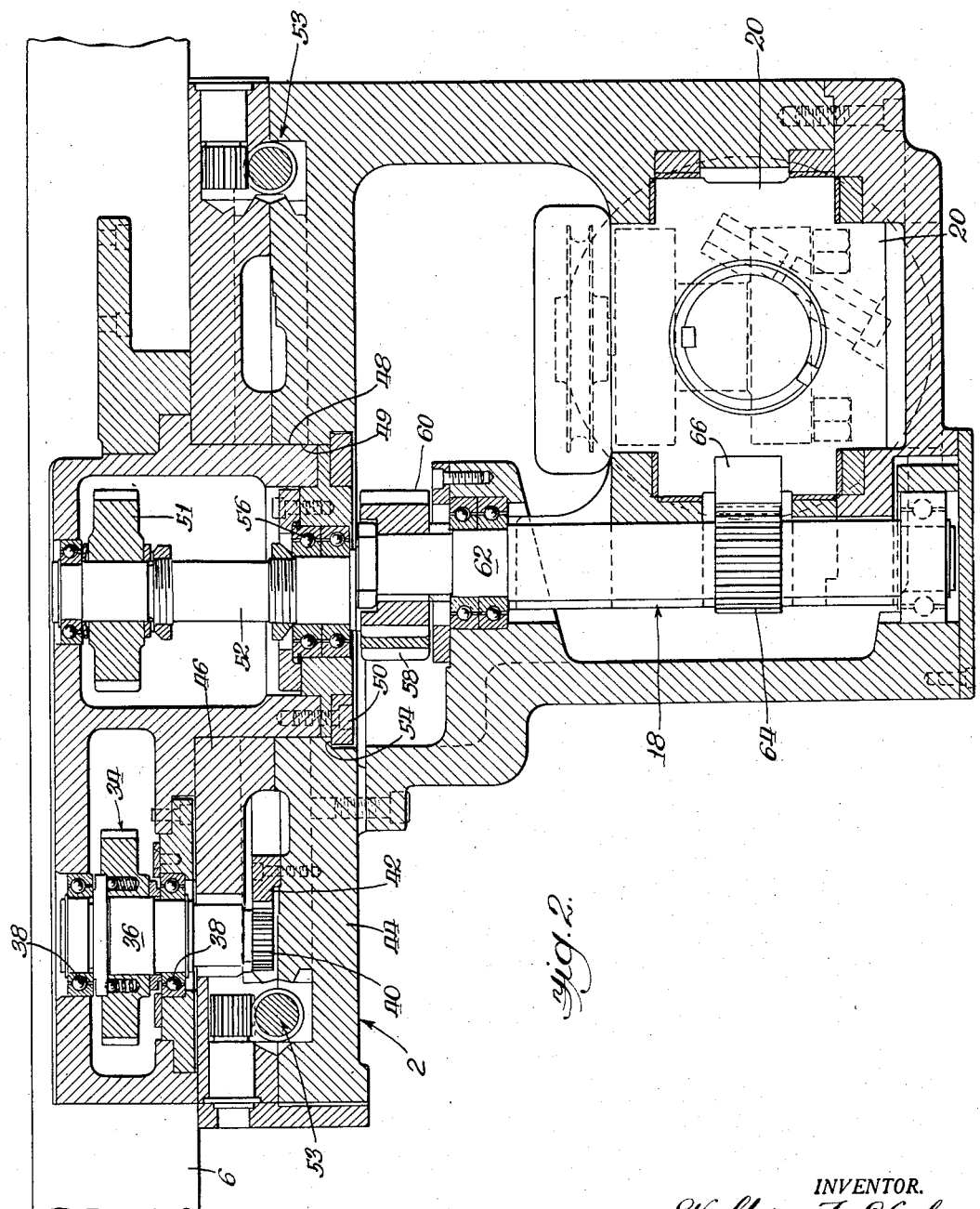

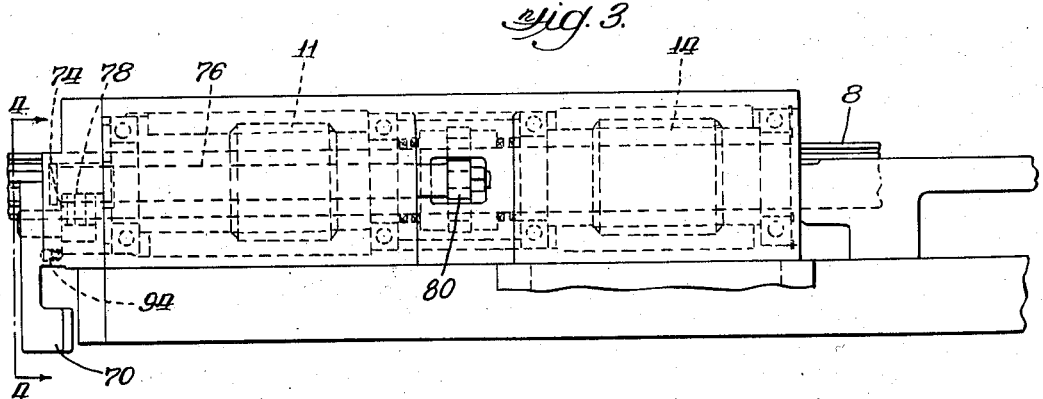
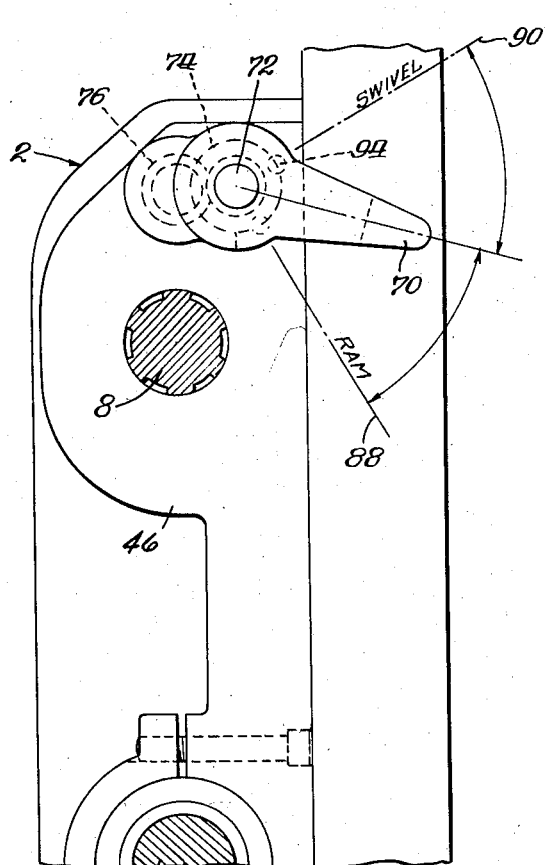
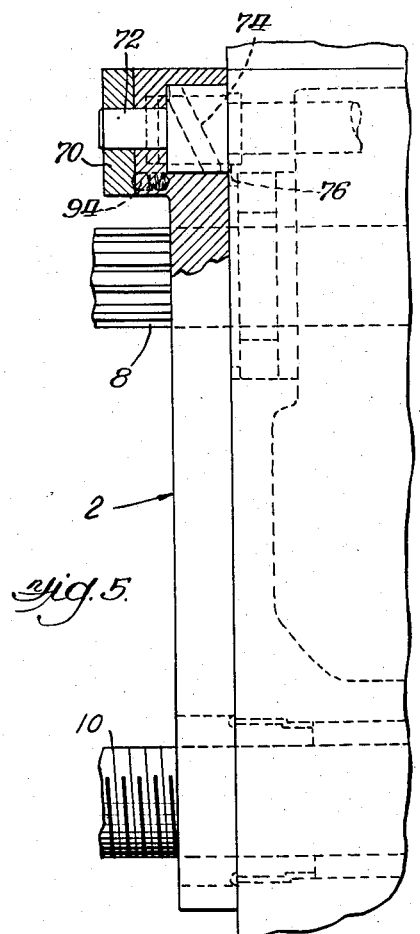

United States Patent Office 2,880,630
Patented Apr. 7, 1959

2,880,630

POWER SWIVELING HEAD

Walter Thomas Hake, Cincinnati, Ohio, assignor to American Steel Foundries, Chicago, Ill., a corporation of New Jersey Application January 28, 1958, Serial No. 711,756

14 Claims. (Cl. 77—4)

The invention relates to vertical boring mills and particularly to an arrangement affording convenient means to power swivel an operating head normally utilized with the mill and is a continuation-in-part of my co-pending application, Serial No. 473,142, filed December 6, 1954, now abandoned.

As will be well understood by those skilled in the art, the vertical boring mill is a type of machine that is provided with a centrally located work table mounted on a base or bed section, said bed section having vertical columns extending upwardly therefrom on opposite sides of the table. The columns serve to mount a generally horizontal rail which is guidably movable in a vertical direction toward and away from the work table. The rail has mounted thereon a ram head or turret head, said ram head or turret head being guidably movable horizontally across the rail toward and away from the axis of rotation of the work table. The ram head or turret head, as the case may be, has power means associated with the down feed rod in the rail, whereby the ram head or turret head may be moved vertically toward or away from the surface of the rotating work table. The ram head or turret head comprises a swivel member which is secured to a saddle member, the saddle member being movably guided on the rail. The swivel member, carrying the ram or turret, is arranged to pivot about a horizontal axis generally perpendicular to the front vertical surface of the rail. This pivoting feature of the swiveling member has been conventional in the art and is needed in order that the ram or turret may be moved vertically and at an acute angular relation to the surface of the work table. For example, in many machine operations it is necessary to cut tapered surfaces on a table mounted work piece, and the ability to swivel the ram or turret greatly facilitates such machining operations.

In the art, as practiced today, all vertical boring mills and turning machines are provided with a swiveling feature for the ram or turret; however, the swiveling is accomplished by worm and worm gear segments associated with the swiveling member and power fed by a manual operator-actuated handle. With the tremendous weights inherent in a ram head or turret head, it requires considerable strength to swivel the head to the desired angle. In addition, the operation is tedious and time consuming in that the operator is required to leave his station and proceed to the head to be swiveled, in many cases requiring climbing onto the machine, and then manually accomplishing the swiveling of the head to the desired angle.

Accordingly, it is a primary object of the invention to provide a novel arrangement whereby power from one of the feed rods is easily and readily available to the operator, whereby swiveling of the head may be easily accomplished.

It is a specific object of the invention to provide a selectively interlocking gear arrangement whereby the power available at the down feed rod may be utilized to swivel the tool holding head.

It is a particular object of the invention to provide a cam operating lever directly associated with a jaw type clutch whereby the power from the down feed rod may be selectively utilized to move the head vertically or in the alternative to swivel the head about the mentioned horizontal axis.

These and other objects of the invention will become apparent in the course of the following description and from an examination of the associated drawings, wherein:

Figure 2 is a fragmentary bottom plan view of the structure of Figure 1, with portions thereof shown in section, illustrating the construction of the tool carrying head and the transmission means carried therein;

Figure 3 is a fragmentary top view taken along line 3—3 of Figure 1;

Figure 4 is a fragmentary sectional view taken along line 4—4 of Figure 3, and

Figure 5 is a fragmentary view, partially in section, of the structure of Figure 4.

Figure 1:
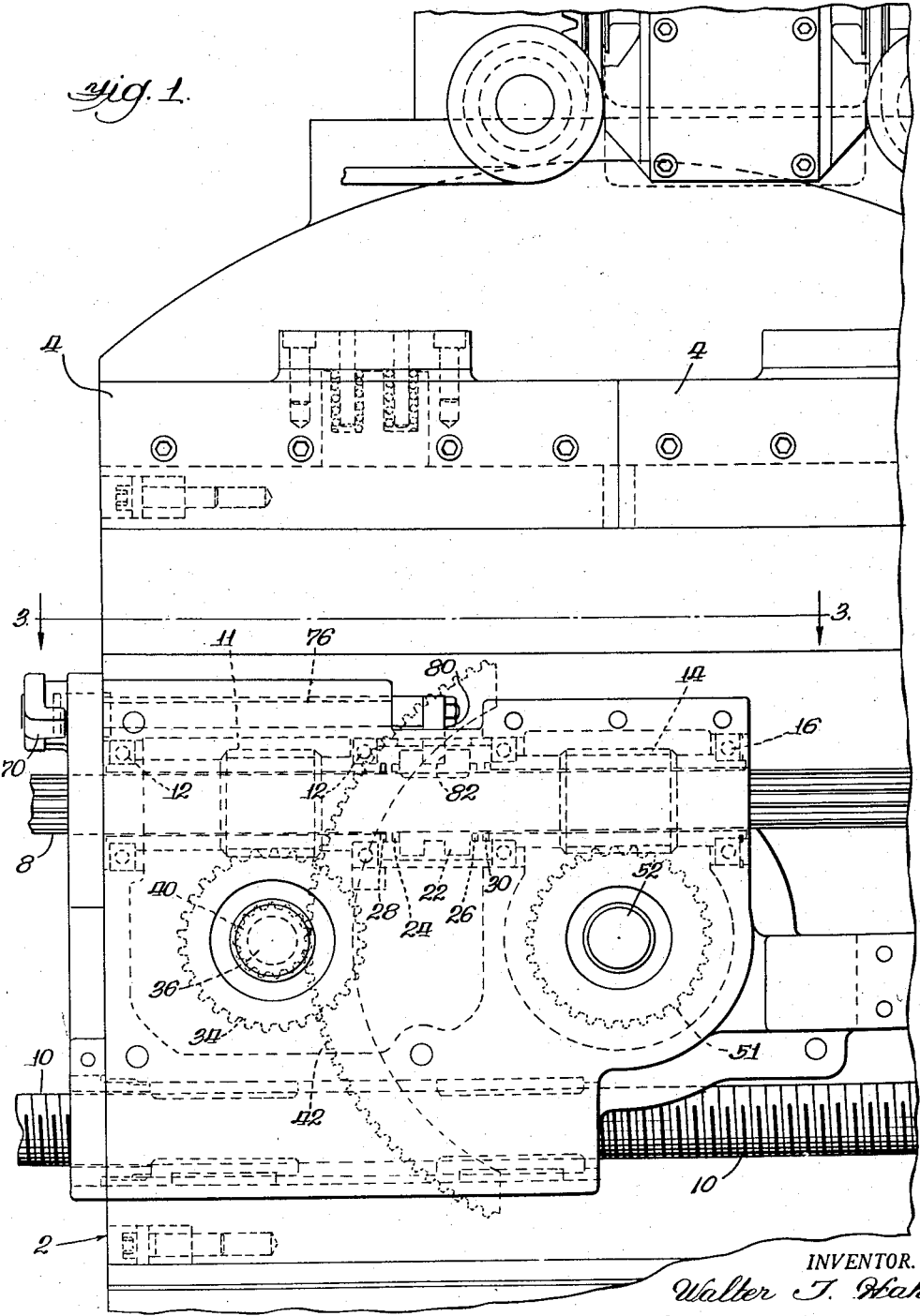
Figure 1 is a fragmentary view of the rear side of a tool carrying head which may be mounted on the rail of a vertical boring mill and illustrating the general arrangement of the swiveling mechanism.

It will be understood that certain features of construction have been omitted from various views where it is believed such features are more clearly and adequately shown in other figures, and it is additionally understood that the invention here disclosed is particularly related to the power swiveling arrangement of a boring mill, hence the detailed physical construction of the mill itself has not been shown.

Describing the invention in detail and directing attention first to Figure 1, it will be seen that the tool carrying head is indicated generally at 2, said head being mountable on a horizontal rail, fragmentarily illustrated at 6 in Figure 2, normally associated with a vertical boring mill. The head 2 is clamped to the rail by means of gibs 4, said gibs being arranged to clasp ways (not shown) on the top and bottom of the rail.

The power swiveling arrangement can best be understood by the disclosure of Figures 2 and 3, which illustrate in detail the particular construction of the tool carrying head. The rail 6 is illustrated receiving, intermediate top and bottom walls thereof, a portion of the tool carrying head 2 in a cavity (not shown) formed in the rail. The down feed rod is indicated at 8, said rod being mechanically interlocked with the power source (not shown) which furnishes the means to rotate the work carrying table whereby the rod 8 is rotated in a particular determined ratio to the movement of the table. Additionally, the rail cavity has a horizontally extending cross feed screw 10 located below the down feed rod 8 and received by a portion of the tool carrying head 2, as will be seen in Figure 1. The down feed rod 8 is preferably of splined construction and is received within an aperture provided in a power transmitting worm 11, said worm 11 being bearing mounted at 12 for free rotation within the tool carrying head 2 independently of the action of the feed rod 8 except when engaged for rotation therewith by means of a clutch mechanism to be described hereinafter. Another worm 14 is similarly bearing mounted as at 16 in the head 2 and serves as a power take-off to feed a mechanical arrangement indicated at 18 (Figure 2), whereby the ram 20 may be moved relative to the head 2. Intermediate the worm 11 and 14 there is mounted in keyed nonrotatable relation to the down feed rod 8, a jaw tooth clutch indicated at 22, said jaw tooth clutch having a plurality of jaws at opposite sides thereof, as at 24 and 26. The jaws 24 may be, upon actuation of the clutch 22 as hereinafter described, engaged with similar jaws 28 of the worm 11, whereby rotatable power of the feed rod 8 may be transmitted through the clutch 22 to the worm 11. Similarly, the jaws 26 may be engageable with complemental jaws 30 formed on the worm 14, whereby the power of the down feed rod 8 may be transmitted to the mechanism 18 for the purpose heretofore mentioned.

Directing attention to Figures 1 and 2, it will be seen that a power take-off gear 34 is provided fixedly mounted to one end of a shaft 36, said shaft being bearing mounted as at 38 in the head 2. The take-off gear 34 mechanically engages the worm 11, whereby action of the worm 11 is transmitted to the shaft 36. As best seen in Figure 2, the shaft 36 has a small pinion gear 40 mounted on the other end thereof, said pinion gear 40 engaging an actuating gear segment 42 or the like which is fixedly mounted to a swivel or pivotal section 44 of the head 2. In this connection it will be noted that the head 2, in addition to the swiveling section 44, comprises a saddle or fixed section 46, said saddle being non-rotatably associated with the rail 6. The swivel section 44 is mounted for pivotal movement on an extended bearing portion 48 of the saddle 46, said extended bearing portion 48 being movably received within an aperture 49 provided in the swivel section 44. A clamping ring 50 serves to maintain the swivel section 44 in assembled relation to the saddle 46 by abuttably engaging a shoulder 54 provided on the swivel 44. Adjacent the outer extremities of the sections 44 and 46, a pair of conventional locking mechanisms are provided indicated generally at 53. These releasable mechanisms enable the operator to lock the swivel section to the saddle section at any selected rotated or pivoted position.

The worm 14 is mechanically associated with another take-off gear 51, said other take-off gear 51 being fixedly mounted on one end of a rotatable shaft 52 mounted substantially centrally of the head 2 and to rotatae on bearings 56 carried by the saddle section 46 of the head 2. The opposite end of the shaft 52 is provided with a driving gear 58 which engages a driven gear 60 fixedly mounted on one end of a drive shaft 62. It will be understood that the axis of the shaft 62 is arranged eccentrically from the axis of the shaft 52, whereby the gear 60 may be constantly in geared engagement with the gear 58 during pivotal movements of the swivel member 44 under the action hereinafter described. The shaft 62 is provided with a gear 64 adjacent the outer extremity, said gear 64 mechanically engaging a rack 66 which is fixedly mounted on the vertically movable ram 20, whereby action of the shaft 62 causes the ram 20 to move vertically toward and away from the work table (not shown), as will be well understood by those skilled in the art. The action and mechanical arrangement of the shafts 52, 62, and the vertical ram drives 64 and 66 are not per se part of the herein disclosed invention, hence have not been illustrated in detail.

A manually operated clutch lever 70, Figures 3, 4 and 5, is provided on one side of the head 2, said clutch lever specifically being mounted on the saddle section 46. As best seen in Figure 5, the lever 70 is fixed to one end of a shaft 72, said shaft 72 extending inwardly of the saddle section 46, whereat it has formed thereon a cam 74, said cam having an actuating surface angularly arranged to the axis of the shaft 72. As best seen in Figure 3, another actuating shaft 76 is mounted for longitudinal movement in the saddle section 46, said actuating shaft 76 extending horizontally above the down feed rod 8 and the associated worm 11. At one end thereof the shaft 76 has a receiving slot 78 which complementally receives the cam 74 of the shaft 72. The opposite end of the shaft 76 is provided with a fixedly mounted depending finger 80 (Figures 1 and 3), said finger 80 being complementally received within a slot 82 peripherally formed in the clutch 22 (Figure 1). As noted, the shaft 76 is mounted in the section 46 for movement longitudinally of said shaft. Such movement of the shaft 76 is initiated by turning the lever 70 through an arc of 90°. It will readily be understood that the 90° motion of the arm 70 will cause a similar rotary action of the cam 74, and because of the angular relation of the cam 74 with the axis of the shaft 72 and the axis of the shaft 76, the engaged shaft 76 will be caused to move longitudinally thereof depending upon the direction of the motion of the lever 70. As illustrated in Figure 4, the lever 70 is shown in neutral position whereby the clutch 22 is not engaged with either the worm 11 or the worm 14. Upon rotataing the shaft 70 downwardly 45° to a position illustrated by the line 88, the shaft 76 will be urged to the right as seen in Figure 1, whereby the clutch 22 will mechanically interconnect with the worm 14, whereby power of the down feed rod 8 will be transmitted to the take-off gear 51 and from thence to the arrangement which vertically feeds the ram head 20. The direction of motion of the ram head 20 will be determined by the direction of rotation of the down feed rod which is controlled by clutch arrangements (not shown) as is well understood by those skilled in the art. Movement of the lever 70 upwardly, as seen in Figure 4, to a point illustrated by the line 90 will cause the rod 76 to move to the left, as seen in Figure 1, whereby the clutch 22 mechanically interlocks with the worm 11 and the power of the down feed rod is transmitted therethrough to the take-off gear 34. Power to the gear 34 causes the shaft 36 to rotate, whereby the pinion gear 40 rotates and the swivel section 44 is urged to pivot due to the engagement between the pinion 40 and the segment 42. Again the direction of swiveling of the section 44 will be determined by the direction of the rotation of the down feed rod 8 in view of the positive mechanical connection therebetween. This direction of motion of the rotation of the down feed rod 8 is similarly controlled, as heretofore noted, by clutch arrangements (not shown) associated with the drive mechanism with the rail, as will be well understood by those skilled in the art. A pair of detents 94 are provided to lock the arm 70 in either of the selected positions 88 or 90.

Thus it will be seen that I have provided a novel power swiveling arrangement whereby a ram or turret head mounted on a rail of a vertical boring mill may be easily and positively swiveled to any angular position a given machine operation may require. Additionally, the arrangement provides for alternate and selective engagement of the power swiveling apparatus or ram apparatus designed to drive the tool carrying head vertically.

I claim:

1. In a power swiveling arrangement for use on a vertical boring mill: a power feed rod; a tool carrying head comprising a saddle section movable axially of said rod, and a swivel section mounted for pivotal movement relative to the saddle section; a clutch operated power take-off, including a worm, mounted in the saddle section and selectively and operatively engageable with said rod; gear means on said swivel section; and other gear means on said take-off operatively engaged with said first mentioned gear means whereby the swivel section may be pivotally moved on and relative to said saddle section, said pivotal movement being independent of any longitudinal movement of said head.

2. In a power swivel arrangement to pivot a rail mounted tool carrying head on a vertical boring mill, said head comprising a saddle section and a swivel section: a rotatable down feed rod; a worm rotatably journaled to the saddle section and having an aperture therethrough receiving the rod; a clutch member non-rotatably mounted on the rod for linear movement therealong; actuating means to linearly move said clutch member into and out of engagement with said worm; a transmission shaft journally mounted in the saddle section; gears fixedly mounted adjacent opposite ends of said shafts, one of said gears being operatively connected to the worm to be driven thereby and the other of said gears being a driving gear; and gear means on the swivel section operatively connected to said driving gear.

3. In a power swivel arrangement according to claim 2, wherein said gear means is a gear segment.

4. A power swivel arrangement according to claim 2, wherein said actuating means comprises a shaft having a finger thereon connected to the clutch member; a lever movably mounted on the head; and cam means interconnecting the lever and the last mentioned shaft, whereby upon movement of the lever the last mentioned shaft is urged to move which in turn moves the connected clutch member.

5. A power swivel arrangement according to claim 4, wherein said shafts are angularly related to each other, and said last mentioned shaft has an axis parallel to the axis of said rod.

6. In a tool moving arrangement for use on a vertical boring mill: a rail on the mill; a tool carrying head on the rail, said head comprising a saddle section non-rotatably secured to the rail and a swivel section pivotally mounted on the saddle section; a tool carrying member movably associated with the swivel section; a feeding element in the rail; gear means on the head adjacent the element to move said tool carrying member in a generally vertical direction; other gear means mounted in the saddle section adjacent said feeding element operative to pivot the swivel section relative to the saddle section; and clutch means to selectively engage the feeding element to said gear means.

7. A tool moving arrangement according to claim 6, and including a lever operated cam arrangement mechanically connected to said clutch means whereby the clutch means may be selectively urged to connect to either of the respective gear means but not to both gear means simultaneously.

8. In a power swiveling arrangement for use on a vertical boring mill: a movable power feeding member; a longitudinally movable tool carrying head having a saddle section; a swivel section on the head pivotally mounted on the saddle section; a power take-off mounted in said saddle section and operatively connected to the swivel section to pivot the latter, said power take-off comprising a gear, a transmission shaft having a driven gear thereon operatively associated with said first mentioned gear, a gear segment in the swivel section, and a pinion gear on the shaft operatively connected to said segment; and means to selectively and operatively connect the take-off to the feeding member, said means comprising a clutch member fixedly connected to said feeding member for rotation therewith and for axial movement therealong, and actuating means to engage said clutch member to the take-off.

9. A power swiveling arrangement for use on a vertical boring mill according to claim 8, wherein said actuating means comprises a lever operated cam mechanism to move the clutch member into and out of engagement with said first mentioned gear.

10. A power swiveling arrangement for use on a boring mill comprising: a tool carrying head comprising a saddle section and a swivel section; a power feed rod; a worm rotatably journaled in the saddle section and having an aperture therethrough receiving the rod; a transmission shaft rotatably journaled in the saddle section; a take-off gear secured to said transmission shaft for rotation therewith, said take-off gear being operatively engaged with said worm; a gear segment on the swivel section; a pinion gear secured to said transmission shaft for rotation therewith, said pinion gear being operatively engaged with said segment; a clutch member rotatable with and slidable longitudinally of said rod; and means to engage said clutch member with said worm.

11. In a power swiveling arrangement for use on a boring mill the combination of: a tool carrying head comprising a saddle section and a swivel section; a gear segment on the swivel section; transmission means operatively engageable with said segment whereby said swivel section may be rotated; gear means journalled in the saddle section and operatively engaged with said transmission means; a power feed rod received through said gear means; said gear means being rotatable relative to said feed rod and movable longitudinally thereof; and means selectively engageable with said gear means for transmitting the motion of said rod through said transmission means to said swivel section.

12. In a power swiveling arrangement for use on a boring mill the combination of: a tool carrying head comprising a saddle section and a swivel section; a gear segment on the swivel section; transmission means operatively engageable with said segment whereby said swivel section may be rotated; gear means journalled in the saddle section and operatively engaged with said transmission means; a power feed rod received through said gear means; said gear means being rotatable relative to said feed rod and movable longitudinally thereof; and means carried by and rotatable with said feed rod and selectively engageable with said gear means whereby rotary motion of said rod may be transmitted through said gear means and said transmission means to rotate said swivel section.

13. In a power swiveling head arrangement for a boring mill having a rail mounting a head comprising a saddle movable horizontally along the rail, and a ram carrying swivel rotatably mounted on the saddle, the combination of: actuating means carried by the head for feeding the ram; other actuating means carried by the head for rotating the swivel; a feed rod; power take-off means operatively connected at all times to the rod for actuation thereby and for movement axially therealong as the saddle moves horizontally along the ram; and clutch means mounted in the head for selectively engaging the take-off means with said actuating means.

14. In a power swiveling head arrangement for a boring mill having a rail mounting a head comprising a saddle movable horizontally along the rail, and a ram carrying swivel rotatably mounted on the saddle, the combination of: actuating means carried by the head for feeding the ram; other actuating means carried by the head for rotating the swivel; a feed rod; power take-off means operatively connected to the rod for rotation therewith and for axial movement therealong with the saddle; and clutch means mounted in the head for engaging the take-off means selectively with respective actuating means.

References Cited in the file of this patent
UNITED STATES PATENTS

| 124,647 | Wheelock | Mar. 12, 1872 |
| 397,410 | Young | Feb. 5, 1889 |
| 1,339,816 | Fiddyment | May 11, 1920 |
| 2,289,874 | Curtis | July 14, 1942 |
| 2,365,078 | Hoier | Dec. 12, 1944 |
| 2,392,963 | Armitage | Jan. 15, 1946 |